UNITED STATES PATENT OFFICE.

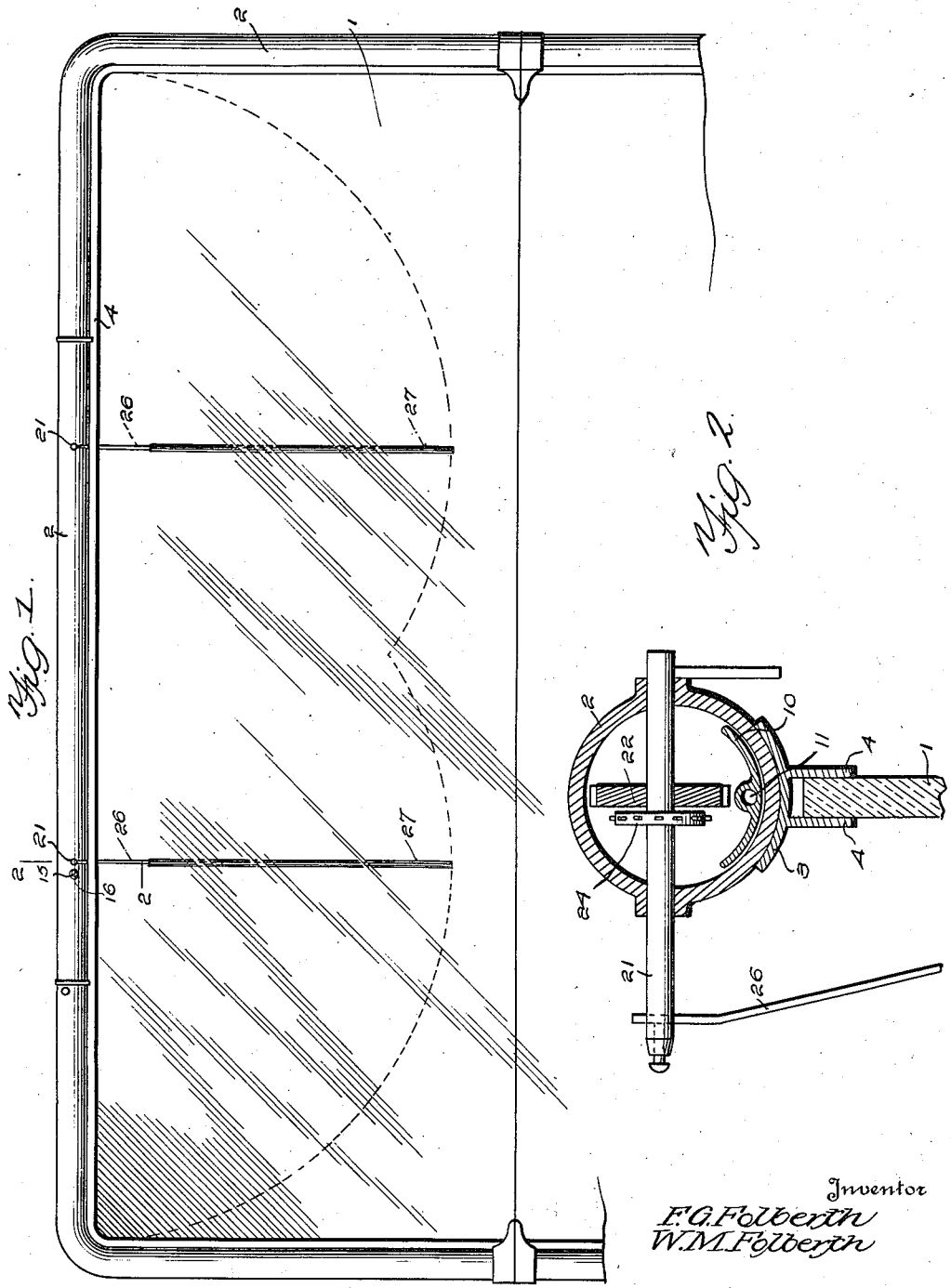

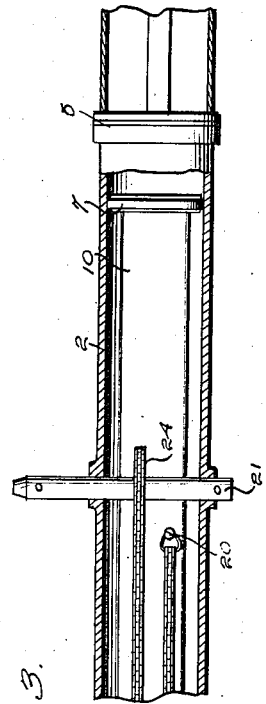
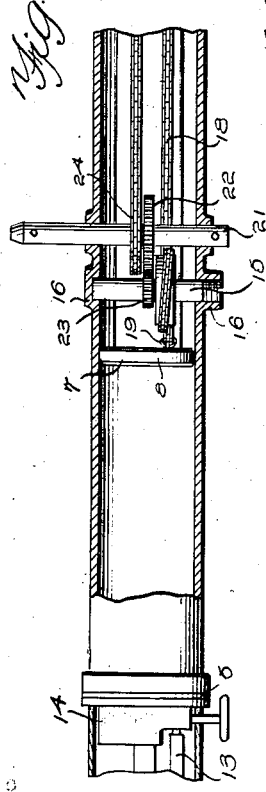
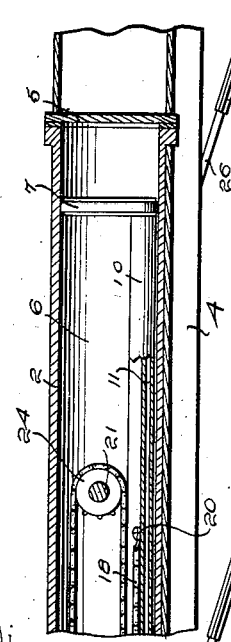
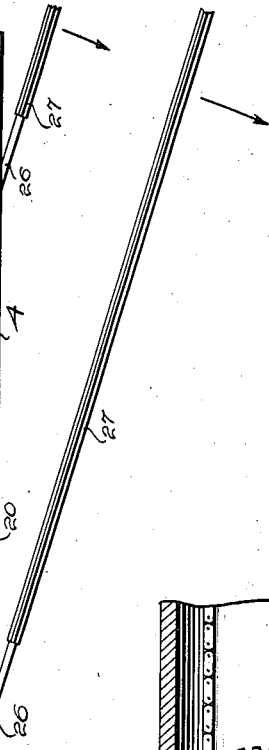
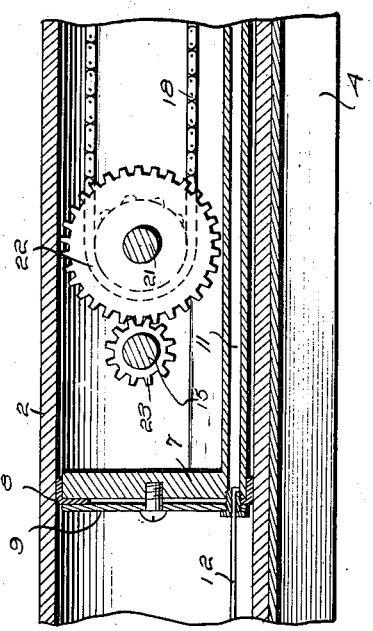

FRED G. FOLBERTH AND WILLIAM M. FOLBERTH, OF CLEVELAND, OHIO.

WINDSHIELD CLEANER.

1,420,538.  Specification of Letters Patent.  Patented June 20, 1922.

Application filed May 16, 1921. Serial No. 469,794.

*To all whom it may concern:*

Be it known that we, FRED G. FOLBERTH and WILLIAM M. FOLBERTH, citizens of the United States, residing at Cleveland, in the county of Cuyahoga and State of Ohio, have invented certain new and useful Improvements in Windshield Cleaners, of which the following is a specification.

This invention relates to windshield cleaners, and is an improvement over the construction shown in our copending application Serial No. 468,485, filed May 11, 1921.

In the said copending application, we have disclosed and claimed a windshield cleaner comprising a cylinder, pistons arranged in the cylinder, an actuating member oscillated by the reciprocation of the pistons, and a pair of cleaner elements spaced from each other and operated by the oscillation of the actuating member.

In the present invention, there is provided a cylinder having a pair of spaced pistons arranged therein, a main shaft, means for transmitting motion from the pistons to the main shaft to oscillate said shaft, a pair of spaced cleaner shafts, means for driving one of said cleaner shafts from the main shaft, and connecting means between the two shafts to operate the shafts in unison.

An important object of the present invention is to provide a pair of cleaner elements mounted on cleaner shafts which extend transversely of the cylinder intermediate the ends of the cylinder.

A further object is the provision of a windshield cleaner comprising a cylinder adapted to be built in to the windshield frame.

In the accompanying drawings, we have shown one embodiment of the invention. In this showing:

Figure 1 is a front elevation of the windshield of a motor vehicle showing the invention applied, Figure 2 is a transverse vertical sectional view on line 2—2 of Figure 1, Figure 3 is a horizontal sectional view through the windshield cleaner, Figure 4 is a longitudinal vertical sectional view, and, Figure 5 is a similar view on an enlarged scale.

Referring to the drawings, the reference numeral 1 designates the windshield of a motor vehicle made of suitable transparent material, such as glass. The windshield is provided with a frame 2, preferably formed of metal, and made tubular. Any suitable means may be provided for securing the windshield to the frame. As shown, an arcuate plate 3 is secured to the frame, the plate being provided with spaced flanges 4, adapted to be arranged on opposite sides of the windshield. The upper horizontal portion of the frame is provided with a pair of cylindrical plates 5, arranged therein and spaced from each other to form a cylinder 6. A pair of pistons 7 are arranged within the cylinder, the pistons being provided with suitable packing 8 to prevent leakage. As shown, the packing may be retained in place by an end plate 9. The pistons are connected to each other by means of a web 10, of arcuate cross-section, preferably arranged adjacent the bottom of the cylinder. As shown, the web is provided with a longitudinal passage 11 for the reception of a valve actuating member 12. As the particular valve mechanism employed forms no part of the present invention, a detail description thereof is deemed unnecessary.

The pistons are adapted to be reciprocated in the cylinder by means of pressure or suction, the opposite ends of the cylinder being alternately placed in communication with a source of pressure or suction by suitable valve mechanism. While any type of operating mechanism may be employed, we prefer to connect the cylinder to the intake manifold of the engine to operate the pistons by the suction in the intake manifold, as disclosed in the copending application of William M. Folberth, Serial No. 273,143, filed January 29, 1919. As shown, a pipe 13 is connected to an enlargement 14, formed on one end of the cylinder, the pipe 13 being connected to the intake manifold of the engine (not shown) and communicating with a chamber within the enlargement 14.

A main shaft 15 is arranged transversely of the cylinder, intermediate its ends, the shaft being mounted in suitable bearings 16, formed by enlargements in the cylinder wall. This shaft is provided with a drum 17, suitably secured thereto to revolve therewith. The main shaft is oscillated by the reciprocation of the pistons through the medium of a flexible element 18, secured to one of the pistons, as at 19, and wrapped around the drum 17, the opposite end of the flexible element being secured to the web 10, as at 20.

A pair of cleaner shafts 21 are also arranged transversely of the cylinder intermediate its ends and spaced from each other. One of these shafts is provided with a gear wheel 22, meshing with a pinion 23, arranged on the main shaft. The cleaner shafts are further provided with sprocket wheels 24 over which passes a sprocket chain 25, connecting the two shafts to each other.

A cleaner rod 26 is secured to each of the cleaner shafts and a cleaner element 27 is mounted on each of the cleaner rods.

Referring to Figure 1 of the drawings, it will be seen that when the cylinder is connected to a source of pressure or suction to alternately create pressure or suction in the opposite ends of the cylinder and thus reciprocate the pistons, the cleaner elements 27 will oscillate over the windshield in an arc of a circle and remove rain, snow, or other material therefrom. The reciprocation of the pistons oscillates the main shaft 15 by means of a flexible element 18, passing over the drum 17. One of the cleaner shafts is driven from the main shaft by means of gear 22 and pinion 23, and the oscillating movement is transmitted to the other cleaner shaft by means of sprocket wheels 24 and chain 25.

The construction of a windshield cleaner wherein the cylinder is arranged within the windshield frame is advantageous, in that it eliminates the necessity of mounting a cylinder on the windshield frame.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:

1. A windshield cleaner comprising a cylinder, a pair of reciprocating pistons mounted therein, means for reciprocating said pistons, a main shaft, connecting means between said shaft and said pistons to actuate said shaft when the pistons are reciprocated, a pair of cleaner shafts, means for actuating said shafts in unison, and means for connecting one of said shafts to the main shaft.

2. A windshield cleaner comprising a cylinder, a piston mounted in said cylinder, means for establishing differential pressures in said cylinder to reciprocate said piston, a main shaft arranged transversely of said cylinder, connections between said shaft and said piston to actuate the shaft when the piston is reciprocated, a pair of cleaner shafts, drive means connecting one of said shafts to the main shaft, and means for connecting said shafts to each other.

3. A windshield cleaner comprising a cylinder, a pair of reciprocating pistons mounted therein and spaced from each other, a web connecting said pistons, means for reciprocating said pistons, a main shaft arranged intermediate the end of the cylinder, a flexible element having its ends connected to one of said pistons and to said web, the intermediate portion of said flexible element being coiled around said main shaft to oscillate it when the pistons are reciprocated, a pair of cleaner shafts mounted in said cylinder and spaced from each other, and means for oscillating said cleaner shafts when the main shaft is oscillated.

4. A windshield cleaner comprising a cylinder, a pair of spaced pistons mounted therein, means for reciprocating said pistons, a main shaft extending transversely of said cylinder intermediate its ends, connecting means between said pistons and said main shaft, a pair of cleaner shafts extending transversely of said cylinder and spaced from each other, a gear mounted on one of said cleaner shafts, a pinion mounted on the main shaft and meshing with said gear to drive said cleaner shaft, and drive means connecting the other cleaner shaft to the first mentioned cleaner shaft.

5. A windshield cleaner comprising a cylinder, a pair of spaced pistons mounted therein, means for reciprocating said pistons, a main shaft mounted in bearings in said cylinder, drive means connecting said shaft to said pistons, a pair of cleaner shafts mounted in bearings in said cylinder and spaced from each other, means for connecting one of said cleaner shafts to the main shaft, sprockets arranged on said cleaner shafts in alinement with each other, and a chain passing over said sprockets to drive the second cleaner shaft.

6. The combination with a windshield frame, said frame being formed of hollow material, of a pair of cylinder heads mounted in said frame whereby a portion of said frame is adapted to serve as a cylinder, a reciprocating piston mounted in said cylinder, a cleaner shaft, and connecting means between said piston and said cleaner shaft.

In testimony whereof we affix our signatures in presence of two witnesses.

FRED G. FOLBERTH.
WILLIAM M. FOLBERTH.

Witnesses:
MAXWELL F. FOURINIER,
J. J. SAUNDERS.